US012670005B2

(12) United States Patent (10) Patent No.: US 12,670,005 B2
Tsirkin (45) Date of Patent: Jun. 30, 2026

(54) TIME-SHIFT SUPPORT FOR ENCRYPTED VIRTUAL MACHINES

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 568 days.

(21) Appl. No.: 18/124,966

(22) Filed: Mar. 22, 2023

(65) Prior Publication Data

US 2024/0320023 A1 Sep. 26, 2024

(51) Int. Cl.
*G06F 9/455* (2018.01)
*G06F 21/53* (2013.01)

(52) U.S. Cl.
CPC .......... *G06F 9/45558* (2013.01); *G06F 21/53* (2013.01); *G06F 2009/45562* (2013.01); *G06F 2201/84* (2013.01)

(58) Field of Classification Search
CPC ................. G06F 9/45558; G06F 21/53; G06F 2009/45562; G06F 2201/84
USPC ........................................................... 718/1
See application file for complete search history.

(56) References Cited

U.S. PATENT DOCUMENTS

| | | | | |
|---|---|---|---|---|
| 7,917,740 | B1 * | 3/2011 | Klaiber ............... | G06F 9/45533 712/244 |
| 9,250,945 | B2 | 2/2016 | Watkins et al. | |
| 9,733,964 | B2 | 8/2017 | Blake | |
| 9,823,877 | B2 | 11/2017 | Vasilyev | |

| | | | | |
|---|---|---|---|---|
| 10,102,151 | B2 * | 10/2018 | Axnix ................... | H04L 9/0891 |
| 10,445,188 | B2 | 10/2019 | Zamir | |
| 10,824,459 | B2 | 11/2020 | Sancheti et al. | |
| 2009/0113109 | A1 * | 4/2009 | Nelson ................ | G06F 11/2046 718/1 |
| 2010/0070870 | A1 * | 3/2010 | Halperin ................. | G06F 21/53 726/19 |
| 2011/0022883 | A1 * | 1/2011 | Hansen ................... | H04L 9/085 713/168 |
| 2012/0209812 | A1 * | 8/2012 | Bezbaruah .......... | G06F 11/1484 707/646 |

(Continued)

FOREIGN PATENT DOCUMENTS

CN 109522730 A * 3/2019 ......... G06F 9/45558

OTHER PUBLICATIONS

Xia, Yubin, et al., "Defending Against VM Rollback Attack" Institute of Parallel and Distributed Systems, Shanghai Jiao Tong University; School of Computer Science, Fudan University, IEEE Xplore, Jun. 25-28, 2012, 5 pages, Boston, MA, USA.

*Primary Examiner* — Pierre Vital
*Assistant Examiner* — Daniel Trainor
(74) *Attorney, Agent, or Firm* — Kilpatrick Townsend & Stockton LLP

(57) ABSTRACT

Systems and methods for secure saving sand restoration of virtualized states is disclosed herein, wherein a guest and/or a virtual machine is aware of being executed from a restored snapshot. An example system comprises a hypervisor; an application running in an encrypted virtual machine; a memory; a processor in communication with the memory executing an application, wherein the application is configured to modify, by an application running in an encrypted VM, a shadow identifier (Shadow ID) saved in private memory; and save a state of the encrypted VM, as a snapshot.

20 Claims, 6 Drawing Sheets

200 modifying, by an application, a shadow identifier (Shadow ID) saved in private memory; 205

Saving the state of the encrypted VM, by the application, as a snapshot 210

(56)         References Cited

U.S. PATENT DOCUMENTS

| | | | |
|---|---|---|---|
| 2015/0256341 A1* | 9/2015 | Ye | H04L 9/321 |
| | | | 713/164 |
| 2019/0243719 A1* | 8/2019 | Yadav | G06F 11/1448 |
| 2021/0105260 A1 | 4/2021 | Tsirkin | |

* cited by examiner

200
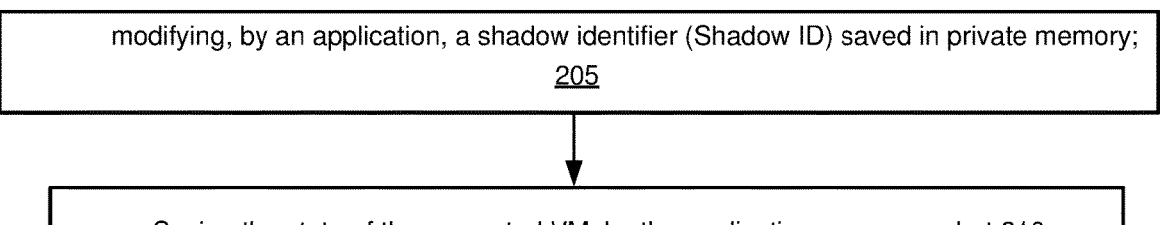
modifying, by an application, a shadow identifier (Shadow ID) saved in private memory;
205
Saving the state of the encrypted VM, by the application, as a snapshot 210
*FIG. 2*

Figure 3A:
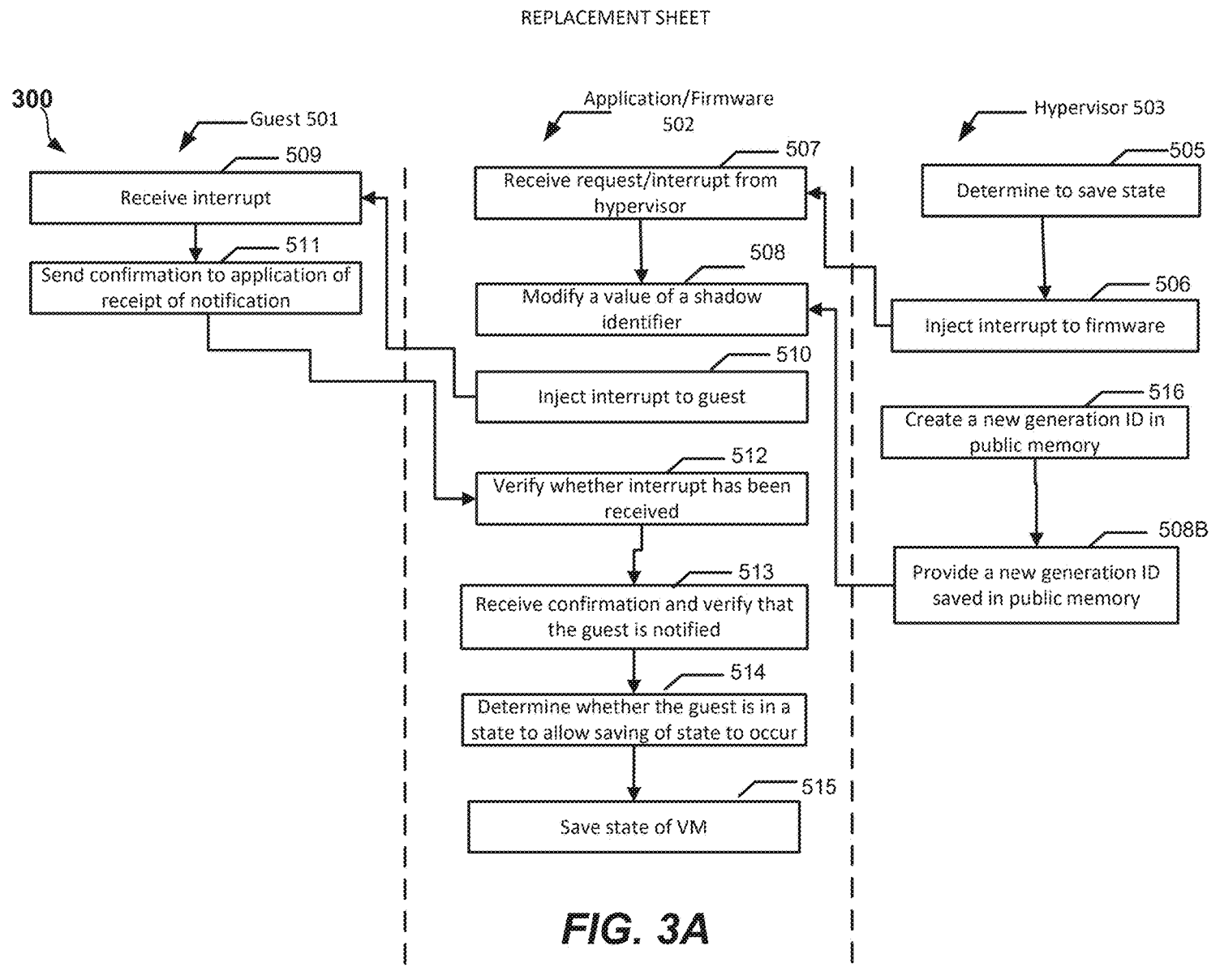

REPLACEMENT SHEET

Hypervisor 503

Determine to save state — 505

Inject interrupt to firmware — 506

Create a new generation ID in public memory — 516

Provide a new generation ID saved in public memory — 508B

Application/Firmware 502

Receive request/interrupt from hypervisor — 507

Modify a value of a shadow identifier — 508

Inject interrupt to guest — 510

Verify whether interrupt has been received — 512

Receive confirmation and verify that the guest is notified — 513

Determine whether the guest is in a state to allow saving of state to occur — 514

Save state of VM — 515

Guest 501

Receive interrupt — 509

Send confirmation to application of receipt of notification — 511

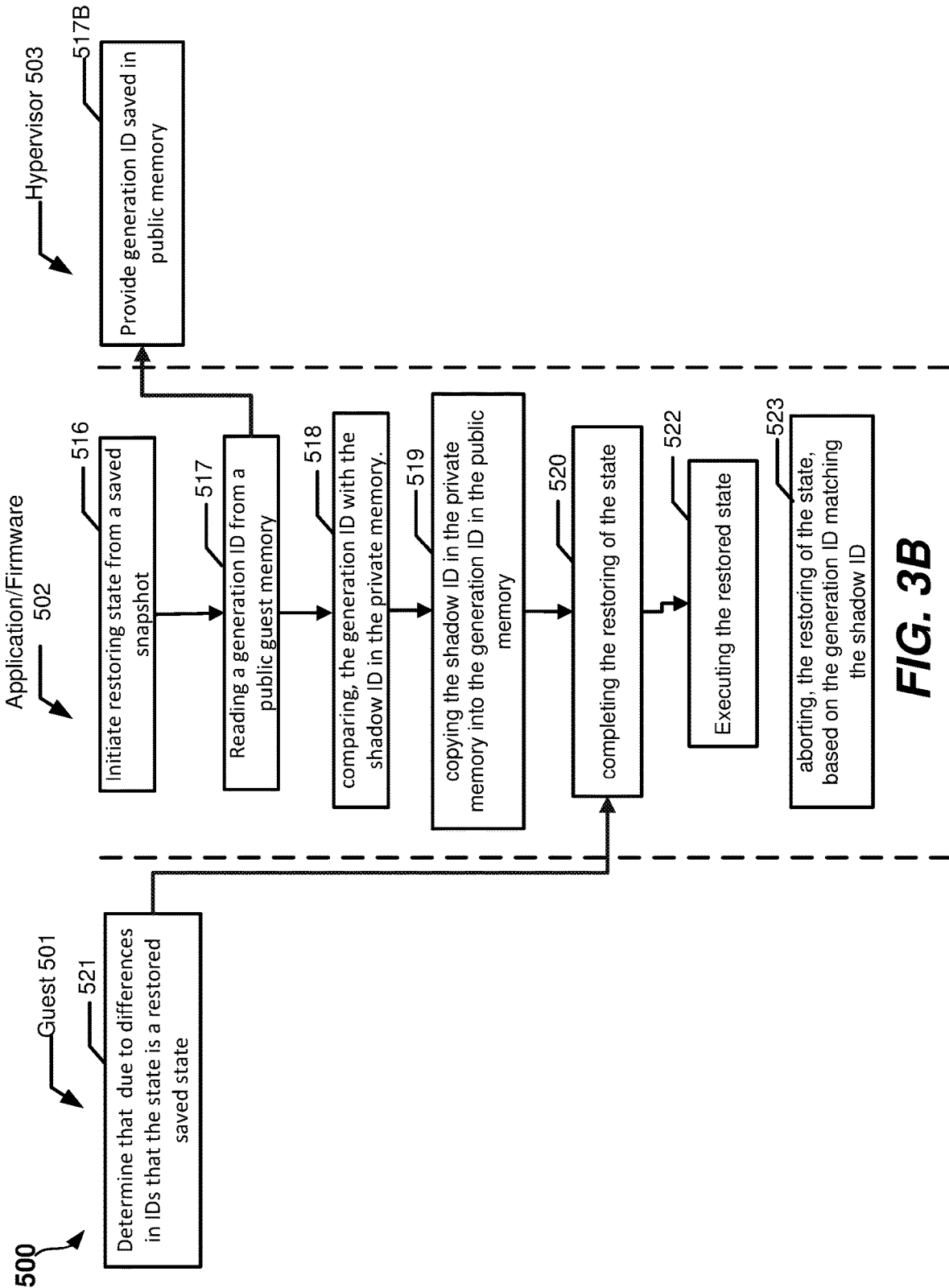

Hypervisor 503

517B — Provide generation ID saved in public memory

Application/Firmware 502

516 — Initiate restoring state from a saved snapshot

517 — Reading a generation ID from a public guest memory

518 — comparing, the generation ID with the shadow ID in the private memory.

519 — copying the shadow ID in the private memory into the generation ID in the public memory 520 — completing the restoring of the state 522 — Executing the restored state 523 — aborting, the restoring of the state, based on the generation ID matching the shadow ID Guest 501

521 — Determine that due to differences in IDs that the state is a restored saved state

3018 Printer

3016 Central Processor

3014 System Memory

3012 I/O Controller

3030 External Interface

3028 Fixed Disk

3026 Keyboard

3024 Serial Port

3022 Monitor

3020 Display Adapter

TIME-SHIFT SUPPORT FOR ENCRYPTED VIRTUAL MACHINES

BACKGROUND

A state of a virtual machine ("VM") or that of a guest running in a VM can be saved as a snapshot that can then be used to restore the saved state. A VM can have its state saved, run some more, and then load its previous state from the saved snapshot. This snapshot serves as a copy of a virtual machine's state at a particular point in time which can be loaded, allowing the VM to restore its state to that of the time of the snapshot. This restoration of state can be used by a VM to roll it back to a previous state if it runs into problems in its current state. This process of restoring state from a saved snapshot can be called time reversal.

SUMMARY

The present disclosure provides new and innovative systems and methods to save and restore virtual machine states to allow a guest of an encrypted virtual machine to know that it is running from a saved state and to ensure no malicious activity by the hypervisor.

In an example, a method includes modifying, by an application running in an encrypted VM, a shadow identifier (Shadow ID) saved in private memory; and saving, by the application, a state of the encrypted VM, as a snapshot.

In an example, a system comprises a system comprising: a hypervisor; an application running in an encrypted virtual machine; a memory; a processor in communication with the memory executing an application, wherein the application is configured to: modify, by an application running in an encrypted VM, a shadow identifier (Shadow ID) saved in private memory; and save a state of the encrypted VM, as a snapshot. Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 2 illustrates a flow diagram of a secure method to save states in encrypted VMs while allowing the guest to know it is running from a restored state, in accordance with one or more aspects of the present disclosure.

FIG. 3A-3B illustrates a flowchart of an example method to save and restore saved states in encrypted VMs and facilitating knowledge of the restoration of state to the guest according to an example embodiment of the present disclosure.

DETAILED DESCRIPTION

Figure 1:
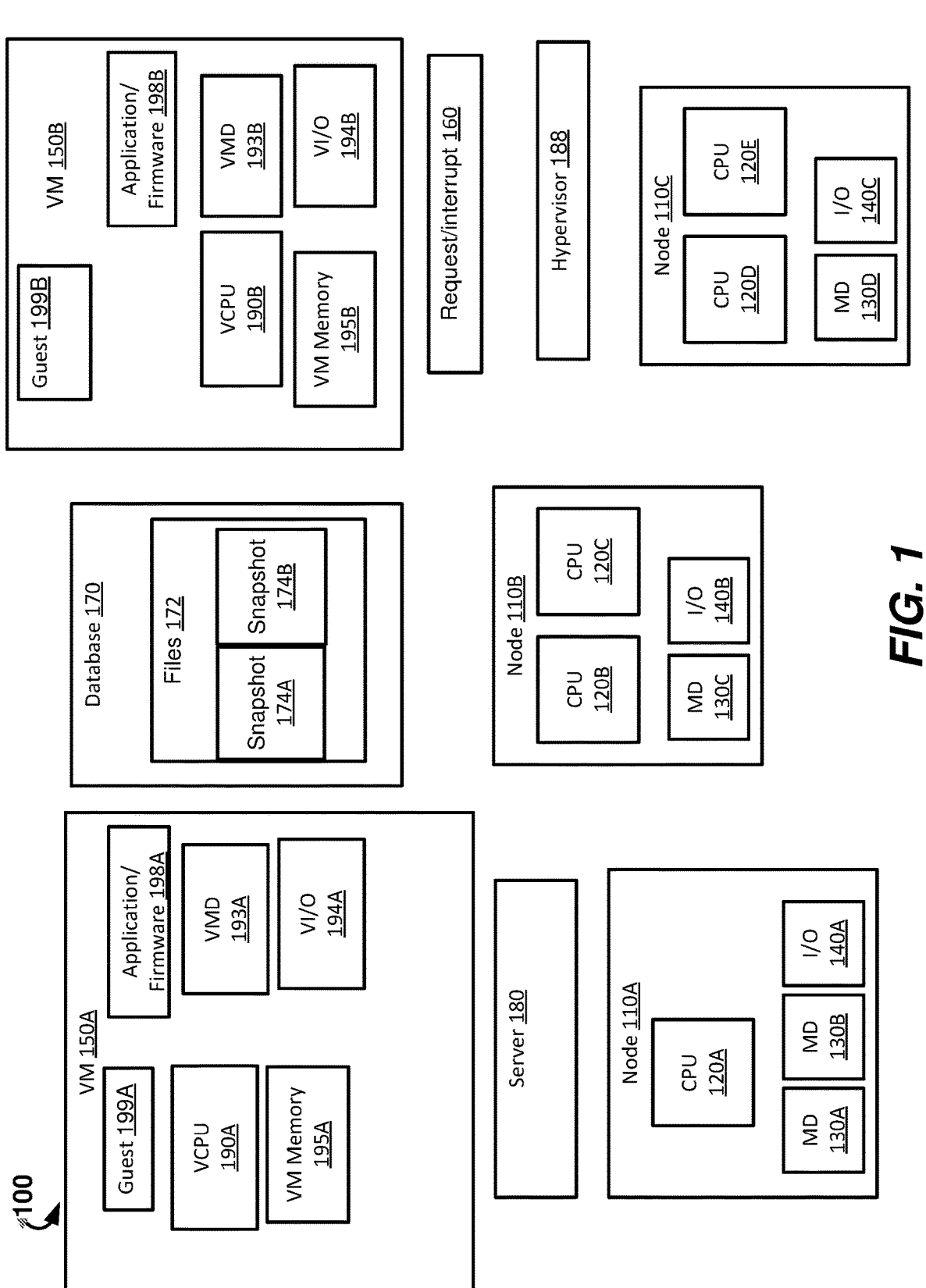
FIG. 1 is a block diagram that illustrates an example system, in accordance with some embodiments of the present disclosure.

Problems such as security and expired certificate issues arise when a VM runs from a restored state. These problems arise from time shifting and time reversals, that create discrepancies and anomalous behaviors that could cause security issues or errors, these could for example take the form of a VM submitting a transaction twice to a database because it does not realize it has already submitted a transaction already after the snapshot was saved and that it is now running from an earlier restored snapshot of a VM state from an earlier point in time that does not include the submitted transaction. In another example, the VM might reuse the same one-time secret such as an expired certificate, weakening cryptographic assumptions.

Generally, problems associated with time-reversals are resolved with cooperation between the hypervisor, the VM, and the guest. This cooperation can involve the hypervisor writing a generation identifier in a public buffer. The hypervisor is responsible for changing the generation ID (by creating a shadow ID) whenever it creates a snapshot of a VM state, so whenever a VM is restored from a snapshot, the hypervisor must provide a different ID (i.e., the current value of the current generation ID of the currently running state) to the VM and/or the guest, the current generation ID should differ from the shadow ID that was created and saved when the snapshot was made and saved, the differences between the two IDs allow the guest and VM to know that they are operating from a restored previous saved state.

However, hypervisors can be malicious, and therefore encrypted VM environments, which aim to isolate the hypervisor from the VM and the guest, create a situation where the guest or application running in the VM is unable to communicate with the hypervisor to verify these identifiers from the saved snapshot and the current state.

Techniques are disclosed herein for systems and methods that allow a guest or VM in an encrypted VM environment to be able to determine that they are running from a restored saved state from an earlier point of time to alleviate problems associated with time-reversal.

A virtual machine (VM) is a software emulation of a computer system. It provides a self-contained environment that mimics the functionality of a physical machine, allowing multiple operating systems (OS) to run simultaneously on the same hardware. Generally there is a generation ID (generation ID) that is provided by a hypervisor, the hypervisor is responsible for changing the generation ID whenever it saves a snapshot, and whenever restoring from a snapshot, the hypervisor must produce a generation ID value of the current state which differs from that created for the saved snapshot. However a hypervisor can be malicious and fail to change a generation ID when saving a snapshot. However, either a firmware or the guest at the point of restoring a state are able to detect this during restore from the snapshot and work to ensure that the current generation ID is different from the one that was used for the saved snapshot (referred to herein as "shadow ID"), ensuring that saving of a snapshot has occurred and that the VM is being restored from a previous saved state. However, encrypted VMs isolate the hypervisor from the rest of the VM, the guest and private memory of the encrypted VM, and the hypervisor is no longer trusted with security of the VM and therefore does not have access to various memory buffers such as private guest memory where the shadow ID is saved, therefore these processes fail in an encrypted VM environment.

A virtual machine has its own set of virtualized hardware resources such as CPU, memory, network interface, and storage devices, which are mapped to the physical resources of the host machine by a hypervisor. Users can interact with the virtual machine as if it were a physical machine, installing and running software and performing tasks within the operating system environment. A guest operating system (also referred to herein simply a "guest") running on a virtual machine (referred to herein as "VM") does not usually know that its state or the state of the virtual machine it is running on, or whether the state is being saved or will be saved at a future point in time. The guest generally does not know it is even running in a virtualized system or environment.

The guest operating system (OS) or guest and applications are installed and run within the virtual machine, while the hypervisor provides the virtualized hardware resources needed for the guest to operate. This time reversal can create several issues, including security issues, for example timebase security measures malfunctioning as the time is reversed, leading to vulnerabilities. In one instance certificates that have already expired may for example assumed by the guest to be still valid, as it does not know that the current state is from a previous time point that has been restored. Another issue can arise with inconsistent time states, where the guest may maintain one time point, and applications having different system states based on the time point of the save state that was loaded.

Allowing the guest to be notified may resolve problems of inconsistent time states and allows the guest to correct or resolve any issues with security knowing which certificates are valid or which have been revoked for example. Presented in this disclosure are several systems and methods to inform or allow the guest to be informed of system state saves that are being currently undertaken or will be undertaken at a future point in time.

As described in various examples disclosed herein, to minimize errors and issues associated with time shifting or time-reversals in virtualized systems, the systems and methods disclosed herein advantageously notify the guest of a saving of a state of the VM, the guest, or of one or more applications running in the VM.

FIG. 1 depicts a high-level component diagram of an example computing system 100 in accordance with one or more aspects of the present disclosure. Computing system 100. The computing system 100 may include a server 180, a database 170, hypervisor 188, one or more virtual machines (VM 150A-B, 150 generally), and nodes (e.g., nodes 110A-C, 110 generally). A hypervisor, also known as a virtual machine monitor (VMM), is a layer of software that enables the virtualization of computer hardware resources, allowing multiple operating systems and applications to run on a single physical machine simultaneously.

The hypervisor provides a layer of abstraction between the physical hardware and the virtual machines running on it. It manages the allocation of hardware resources, such as CPU, memory, and storage, to each virtual machine, and isolates them from each other to prevent interference. A database 170 may run on a virtual machine (e.g., VM 150A-B. 150 generally) or on a node (e.g., node 110A-C, 110 generally). The database 170 may include data that relates to, or is utilized by a specific virtual machine 150A-150B, nodes 110A-110C, computing environments 160A-160B, guests 199A-199B, or applications 198A-

198B. In various implementations, files 172 in a database 170 may be backing an application (e.g., application 198A or application 198B, or a VM 150A-150B). Database 170 may include a plurality of files 172, which may include data structures, objects, records, data associated with modifications to the VM 150A-150B, and/or other data. In some implementations, files (e.g., files 176) may be generated and/or updated to keep track of previous states and/or versions of the states of a VM 150A-150B, and include snapshots 174A-174B of a state of a VMs 150A-150B. In various aspects. A hypervisor 188, which is a software layer to manage VMs 150A-150B, may be installed on the physical hardware of computing system 100, for example, server 180, any of nodes 110A-110C, or any combination thereof. The hypervisor 188 acts as a mediator between the physical hardware of computing system 100 such as the server 180 and the nodes 110A-110C and the VMs 150A-150B In some implementations, an application/firmware 198A-198B may receive a request (e.g., request 160) to save a state of the VM 150A-150B it is running on, or the state of the guest 199A-199B or of application 198A-198B, and/or a request 160 to notify the guest 199A-199B that it will save the state of VM 150A-150B that the application is running on.

In various implementations, a database system (e.g., system 170) may be the location where the state of the VM is saved as a snapshot 174A-174B. A new snapshot/saved state 174A-174B may be created upon a request 160 or otherwise via the hypervisor 188 issuing a request or an interrupt 160 to application 198A-198B, which saves the snapshot as snapshot 174A-174B on database 170. Injecting an interrupt 160 refers to the process of sending a signal to a running program or process to cause it to temporarily halt its execution and transfer control to the operating system or another process. Interrupts are commonly used in operating systems to handle events such as hardware interrupts, software interrupts, or exceptions. Hardware interrupts occur when an external device, such as a keyboard or network card, requires the attention of the CPU. The device signals the CPU by generating an interrupt request (IRQ), causing the CPU to stop executing its current task and transfer control to the interrupt handler routine in the operating system.

In several aspects, Applications/firmware 198A-198B are comprised of firmware, which can be a type of software embedded into hardware devices such as computer chips, controllers and other devices, and provide low-level control over the hardware to enable the hardware to perform its intended functions.

Software interrupts are used by programs or applications to request services from the operating system or guest operating system, such as reading a file from disk or allocating memory. A program can generate a software interrupt request, causing the CPU to transfer control to the appropriate interrupt handler routine in the operating system.

In many implementations, saving of a state as a snapshot may be executed directly at a database system (e.g., database 170) by copying objects from a current state. Saving a state refers to the process of preserving the current state of a system, application or process. This allows the system such as virtual machine 150A-150B, computing system 100 or guests 199A-199B to be restored to a state of that of the saved state. In various aspects, saving a state refers to the process of preserving the current state of a system such as computing system 100, or CM 150A-150B, guests 199A-199B, or applications 198A-198B, or process. This allows the VM 150A-150B to resume from the same point where it was saved, without losing any data or progress that was made. The saved state is usually a snapshot preserved in database 170.

In most implementations, a snapshot 174A-174B of a state of a VM 150A-150B, can be created by saving the state of the VMs 150A-150B in database 170, wherein from which they can be loaded to restore the state to its saved form.

Virtual machines 150A-B may include a virtual machine memory (VM Memory), a private guest virtual memory 196A-196B which is only accessible by the guest 199A-199B and not hypervisor 188, a virtual CPU (VCPU), virtual memory devices 193A-193B (VMD), and virtual input/output devices 194A-194B (VI/O). For example, virtual machine 150A may include virtual machine memory 195A, a virtual CPU 190A, a virtual memory devices 193A, and a virtual input/output device 194A. Similarly, virtual machine 150B may include virtual machine memory 195B, a virtual CPU 190B, a virtual memory devices 193B, and virtual input/output device 194B. In an example, applications 198A-B may be different applications or services. In another example, applications 198A-B may be different instances of the same application or service.

In encrypted versions of VMs 150A-150B, some or all portions of the virtualized components of VM 150A-150B are inaccessible to hypervisor 188 or server 180, and are only accessible or modifiable by guest 199A-199B and/or application 198A-198B.

In an example, a virtual machine 150A may execute a guest operating system 199A and run applications 198A-B which may utilize the underlying VCPU 190A, VMD 193A, and VI/O device 194A. One or more applications 198A-B may be running on a virtual machine 150A under the respective guest operating system 199A. A virtual machine (e.g., VM 150A-B, as illustrated in FIG. 1) may run on any type of dependent, independent, compatible, and/or incompatible applications on the underlying hardware and operating system ("OS"). In an example, applications (e.g., App 198A-B) run on a virtual machine 150A may be dependent on the underlying hardware and/or OS. In another example embodiment, applications 198A-B run on a virtual machine 150A may be independent of the underlying hardware and/or OS. For example, application 198A can run on a first virtual machine 150A and may be dependent on the underlying hardware and/or OS while application (e.g., application 198B) run on a second virtual machine (e.g., VM 150B) is independent of the underlying hardware and/or OS. Additionally, applications 198A-B run on a virtual machine 150A may be compatible with the underlying hardware and/or OS. In an example embodiment, applications 198A-B run on a virtual machine 150A may be incompatible with the underlying hardware and/or OS. For example, application 198A run on one virtual machine 150A may be compatible with the underlying hardware and/or OS while applications 198B run on another virtual machine 150B are incompatible with the underlying hardware and/or OS. Applications 198A-198B may be firmware, for example firmware that is specifically designed to interact with the hardware of computing system 100 including the hardware in any of nodes 110A-110C.

In an example, virtual machines 150A-B may instead be containers that execute applications or services, such as micro-services. In an example, the containers may each run a process or service and the containers may be any execution environment. For example, the containers may be a virtual server. It should be appreciated that containers may be stand-alone execution environments, similar to that of a virtual machine. The applications 198A-B or services (e.g., micro-services) may run in a software container or a virtual machine (e.g., virtual machines 150A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 150A-B may be provisioned on the same host or node (e.g., node 110A) or different nodes, for example as any of nods 110A-110C. For example, VM 150A and VM 150B may both be provisioned on node 110A. Alternatively, VM 150A may be provided on node 110A while VM 150B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

FIG. 2 illustrates a flow diagram of a method to save and restore states securely in a confidential computing environment such as an encrypted VM, to allow the VM or a guest running on it to know that it is running from a restored, previously saved state. Although the example method 200 is described with reference to the flow diagram illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. For example, in the illustrated flow diagram, an application 198A is running in a virtual machine 150A that utilizes a guest operating system or guest 199A.

Now referring to FIG. 2 in conjunction with FIG. 1, as shown in FIG. 2, method 200 can commence by modifying a shadow identifier (shadow ID) in a private guest memory, by an application such as firmware running in the encrypted VM, e.g., VM 150A-150B, FIG. 1. This modifying 205 can be triggered upon a saving of state or determination by the application, e.g., application 198A-198B to save a state of the encrypted VM e.g., VMs 150A-150B, or of a guest, e.g., guests 198A-198B, FIG. 1, of a VM, by an application, e.g. application/firmware 198A, FIG. 1 running in the VM, e.g., VM 150A, of an upcoming saving of state of at least one of the guest, the VM, or the application. The modifying 205, in various embodiments may be triggered or be based upon the application receiving a request, instructions or an interrupt from the hypervisor, e.g. hypervisor 188, FIG. 1 to save the state of the VM. A shadow ID is a value that is associated with a virtual machine (VM) page in memory in a virtualized environment. It is generally used by the hypervisor (or the guest) to track changes made to the page while it is in use by the VM. However in an encrypted VM environment, the shadow ID residing in guest private memory is inaccessible by the hypervisor. Private guest memory (herein also referred to as "private memory" is a memory area within a virtual machine that is only accessible by the guest operating system running within that virtual machine. It is a protected area of memory that is isolated from other virtual machines or hypervisors running on the same physical host as well as from the host itself. Therefore a shadow ID that is stored in private guest memory is inaccessible by the hypervisor.

The modifying 205 may take the form of copying, by the application or firmware, e.g., firmware 198A-198B, FIG. 1, a generation identifier (Generation ID) into private memory as the shadow ID in private memory after the application or firmware has read the generation ID and compared it to what is saved in private guest memory, once it validates or determines that the generation ID is valid i.e., then it can proceed to copy it into private guest memory as the new shadow ID. This however depends on the hypervisor, e.g., hypervisor 188, FIG. 1 for generating or providing a new generation ID upon a save or upcoming saving of state, if the hypervisor does not provide a generation ID or a new generation ID for the upcoming saving of state, then the application or firmware, e.g., firmware 198A-198B can generate a random identifier as the shadow ID; and save the generated random identifier as the shadow ID in the private memory.

Once the modifying 205 is complete, the application, e.g., Application 198A saves the state 210 of the encrypted virtual machine as a snapshot, e.g., snapshots 174A-174B, in various embodiments in a database, e.g., database 170, FIG. 1. The modifying 205 may comprise copying, by the application, a generation identifier (Generation ID) already created by a hypervisor, e.g., hypervisor 188, FIG. 1 in a public memory as the new shadow ID in private memory. In several embodiments, the modifying 205 may comprise, generating by the application, a random identifier and saving it as the shadow ID in private memory. This allows the application, or the VM to generate a new identifier that could be saved and be associated with the saved snapshot, irrespective of the hypervisor generating a new identifier and saving it in public memory.

FIG. 3A-3B illustrates a flowchart of an example method 300 of securely saving and restoring states in an encrypted virtualized environment such as an encrypted VM, e.g. VM 150A-150B, FIG. 1, where the guest and the VM are able to determine that they are running from a restored state. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated and in some embodiments, any and all of the blocks described are optional. The method 300 may be performed by processing logic that may comprise hardware (circuitry, dedicated logic, etc.), software, or a combination of both.

Now continuing to refer primarily to FIG. 3A-3B, with reference together with FIG. 1-2. As shown in FIG. 3A-3B, an example method 300 may begin, in several embodiments, with the hypervisor 503 e.g., hypervisor 188, FIG. 1 determining 505 to save a state of a VM, e.g., VM 150A-150B, FIG. 1. In various embodiments, the hypervisor 503 can then inject 506 an interrupt or transmit a request to firmware 502 instructing it to save state of the VM it is running in. The application 502, which can in several embodiments be firmware 502, received 507 the request/instructions/interrupt from the hypervisor 503. The application 502 can then modify 508 a value of an identifier, for example by modifying or adding a shadow identifier in private memory such as private guest memory, this is equivalent to modifying 205, FIG. 2, where the modification can occur through copying a generation ID provided 508B by the hypervisor 503, or by the application 502 generating a new random identifier, as described in detail in relation to FIG. 2. The private guest memory can in several aspects be part of virtual memory 195A-195B, FIG. 1. The hypervisor 503 can create 516 a new generation ID in public memory in anticipation or preparation, or as part of the process to save the state of the encrypted VM. In various embodiments, the application/firmware 502 will receive 507 the injected interrupt/instructions/request from the hypervisor 503 and will proceed to inject 510 an interrupt to the guest 501 to notify it of a saving of a state. The guest 501 can receive 509 the interrupt from the application/firmware 502 and is thus notified of a saving of state. The Application/firmware 502 can then proceeds to verify 512 whether the guest has received the interrupt successfully and may do this by communicating with guest 501. The guest 501 may send 511 a confirmation that it has received the interrupt or is aware of a saving of a state to firmware 502. The application/firmware 502 can then receive the confirmation from the guest 501, and then determine 513 that the guest 501 is notified of a saving of state and then determine 514 whether the guest 502 is in a state to allow a saving of state to occur. The application 502 can then save 515 the state of the virtual machine via a firmware assisted save, or alternatively via hardware assisted snapshots that make use of a processor and/or the processor firmware. In several embodiments, the saving 515 of the snapshot is undertaken by a processor, which may be a virtual processor such as virtual CPU, e.g., VCPU 190A-190B, FIG. 1.

In various embodiments, application/firmware 502 initiates 516 restoring state from a saved snapshot. This restoration of a state of a VM may comprise reading 517 a generation ID from a public guest memory, where the generation ID is provided 517B by the hypervisor. The application 502 then compares 518 the generation ID (associated with the current running state) from public memory to the shadow ID (associated with the saved snapshot) to the snapshot in private memory. If the two identifiers are different, the application/firmware 502 then is able to verify that the two states are different. The application 502 then continues the restore process by copying 519 the shadow ID in private memory to the public memory to replace the generation ID, since now the ID of the restored state is the relevant operational ID. The application/firmware 502 then completes 520 the restoring of state, and executes 514 the restored state. If the generation ID and shadow ID bare different, it allows guest 501 to determine 521 that due to differences in the IDs that the state is s restored saved state. In several embodiments, If the generation ID and the shadow ID match, then there is a problem with either the states being the same, or a failure to generate a new generation ID that is saved to private memory when the saved state was created, upon this occurring, the application/firmware 502 can abort 523 the restoration of saved state.

Figure 4:
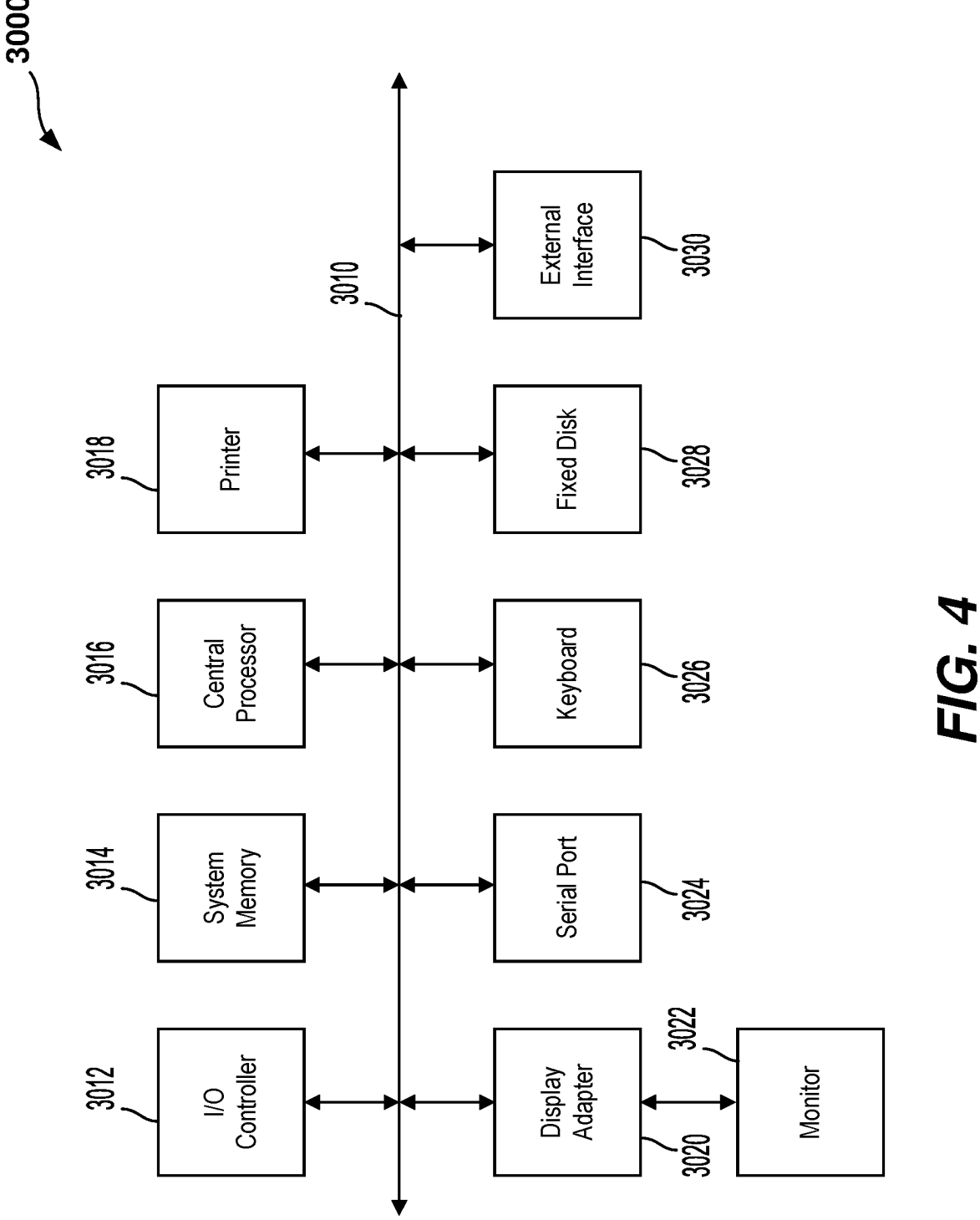
FIG. 4 is a block diagram of a computer apparatus with data processing subsystems or components, according to at least one aspect of the present disclosure.

FIG. 4 is a block diagram of a computer apparatus 3000 with data processing subsystems or components, according to at least one aspect of the present disclosure. The subsystems shown in FIG. 4 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

Figure 5:
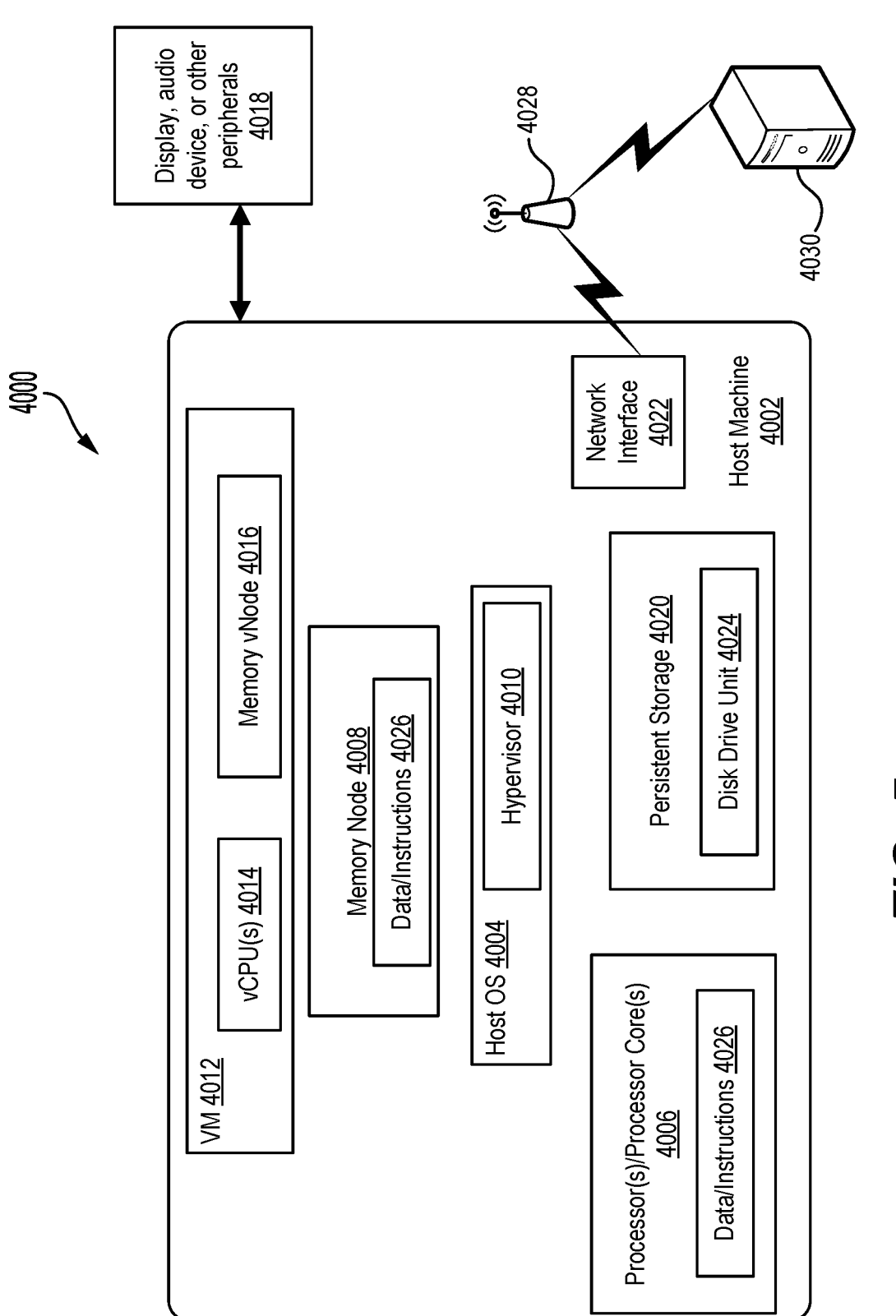
FIG. 5 is a diagrammatic representation of an example system that includes a host machine within which a set of instructions to perform any one or more of the methodologies discussed herein may be executed.

FIG. 5 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 3002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media.

The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method for mitigating time shifting errors or time reversal errors associated with an encrypted virtual machine (VM), the method comprising:

modifying, by an application running in the encrypted VM, a shadow identifier (Shadow ID) saved in a private memory of the encrypted VM, wherein the private memory is inaccessible to a hypervisor associated with the encrypted VM; and saving, by the application, a state of the encrypted VM as a snapshot.

2. The method of claim 1, further comprising:

receiving, by the application, instructions from the hypervisor to save the state of the encrypted VM.

3. The method of claim 1, wherein the modifying comprises:

reading, by the application, a generation identifier (ID) from a public memory that is accessible to the hypervisor, the public memory being different from the private memory;

comparing, by the application, the generation ID to the shadow ID that is stored in the private memory; and copying, by the application, the generation ID for saving as the shadow ID in the private memory.

4. The method of claim 1, wherein the modifying comprises:

generating, by the application, a random identifier to be the shadow ID in the private memory; and saving, by the application, the generated random identifier as the shadow ID in the private memory.

5. The method of claim 1, further comprising:

determining, by the application, whether a guest running inside the encrypted VM is in a state condition that allows the state of the encrypted VM to be saved; and based on determining that the guest is in the state condition that allows the state of the encrypted VM to be saved, saving, by the application, the snapshot.

6. The method of claim 1, further comprising:

injecting, by the application, an interrupt into a guest, wherein the interrupt informs the guest of a saving of the state of the encrypted VM.

7. The method of claim 1, further comprising:

initiating restoring of the state from the saved snapshot; and based on the restoring:

reading, by the application, a generation identifier (ID) from a public memory; and comparing, by the application, the generation ID with the shadow ID in the private memory.

8. The method of claim 7, further comprising:

replacing, by the application, the generation ID in the public memory with the shadow ID in the private memory, based on the generation ID not matching the shadow ID; and completing the restoring of the state, based on the generation ID not matching the shadow ID.

9. The method of claim 7, further comprising:

aborting, by the application, the restoring of the state based on the generation ID matching the shadow ID.

10. The method of claim 1, further comprising:

injecting, by the hypervisor, an interrupt into the application to instruct the application to save the state of the encrypted VM; and saving, by the application, the snapshot based on receiving the interrupt.

11. The method of claim 1, wherein the saving of the state of the encrypted VM is a firmware assisted saving undertaken by the application.

12. The method of claim 1, wherein the saving of the state of the encrypted VM is a hardware saving undertaken by at least one of a processor or firmware associated with the processor.

13. The method claim 12, where the processor is a virtual processor.

14. The method of claim 1, wherein the application is firmware.

15. A system comprising:

a hypervisor;

an application running in an encrypted virtual machine (VM), wherein the encrypted VM is associated with the hypervisor;

a memory;

a processor in communication with the memory executing the application, wherein the application is configured to perform operations including:

modifying, by the application running in the encrypted VM, a shadow identifier (Shadow ID) saved in a private memory of the encrypted VM, wherein the private memory is inaccessible to the hypervisor associated with the encrypted VM; and saving, by the application, a state of the encrypted VM as a snapshot.

16. The system of claim 15, wherein the application is firmware.

17. The system of claim 15, wherein the application is further configured to:

initiate restoring of the state from the saved snapshot;

read, by the application, a generation identifier (ID) from a public memory that is separate from the private memory, wherein the public memory is accessible to the hypervisor; and compare, by the application, the generation ID with the shadow ID.

18. The system of claim 17, wherein the application is further configured to:

copy the shadow ID from the private memory into the public memory to replace the generation ID in the public memory, based on the generation ID not matching the shadow ID; and complete the restoring of the state, based on the generation ID not matching the shadow ID.

19. The system of claim 17, wherein the application is further configured to:

abort, by the application, the restoring of the state based on the generation ID matching the shadow ID.

20. A non-transitory computer-readable storage medium storing instructions that are executable by a processor for causing the processor to perform a method comprising:

modifying, by an application running in an encrypted VM, a shadow identifier (Shadow ID) saved in a private memory of the encrypted VM, wherein the private memory is inaccessible to a hypervisor associated with the encrypted VM; and saving, by the application, a state of the encrypted VM as a snapshot.

\* \* \* \* \*